US009256069B2

(12) United States Patent
Wada (10) Patent No.: US 9,256,069 B2
(45) Date of Patent: Feb. 9, 2016

(54) IMAGE PROCESSING APPARATUS IMAGE PROCESSING METHOD AND PROGRAM USING ELECTRODES CONTACTING A FACE TO DETECT EYE GAZE DIRECTION

(75) Inventor: Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 13/247,419

(22) Filed: Sep. 28, 2011

(65) Prior Publication Data

US 2012/0086788 A1 Apr. 12, 2012

(30) Foreign Application Priority Data

Oct. 12, 2010 (JP) ................................. 2010-229770

(51) Int. Cl.
| | |
|---|---|
| H04N 13/04 | (2006.01) |
| G02B 27/00 | (2006.01) |
| G02B 27/01 | (2006.01) |
| G02B 27/22 | (2006.01) |
| H04N 13/00 | (2006.01) |

(52) U.S. Cl.
CPC ........ *G02B 27/0093* (2013.01); *G02B 27/0172* (2013.01); *G02B 27/2228* (2013.01); *H04N 13/0018* (2013.01); *H04N 13/0438* (2013.01); *H04N 13/0484* (2013.01)

(58) Field of Classification Search
CPC .......... H04N 13/0018; H04N 13/0484; H04N 13/0438; G04N 13/0018; G02B 27/2228; G02B 27/0172; G02B 27/0093
USPC .................. 348/56, 222.1, 53; 345/7, 8, 589; 349/15; 340/540
See application file for complete search history.

(56) References Cited

U.S. PATENT DOCUMENTS

| | | | | |
|---|---|---|---|---|
| 4,595,017 | A * | 6/1986 | Semenov et al. ............. | 600/546 |
| 5,051,735 | A * | 9/1991 | Furukawa ......................... | 345/7 |
| 5,297,550 | A * | 3/1994 | Margosian ..................... | 600/419 |
| 6,198,484 | B1 * | 3/2001 | Kameyama .................... | 345/419 |
| 6,545,650 | B1 * | 4/2003 | Yamada et al. .................... | 345/7 |
| 7,537,573 | B2 * | 5/2009 | Horst ................................. | 601/5 |
| 8,155,479 | B2 * | 4/2012 | Hoffman et al. .............. | 382/276 |
| 8,471,890 | B1 * | 6/2013 | Golas ......................... | 348/14.08 |
| 8,866,841 | B1 * | 10/2014 | Distler .......................... | 345/619 |
| 2003/0021445 | A1 * | 1/2003 | Larice et al. ................. | 382/104 |
| 2003/0174886 | A1 * | 9/2003 | Iguchi et al. ................. | 382/167 |
| 2004/0101209 | A1 * | 5/2004 | Tanaka .......................... | 382/275 |
| 2004/0155834 | A1 * | 8/2004 | Wit et al. ........................... | 345/7 |

(Continued)

FOREIGN PATENT DOCUMENTS

| | | |
|---|---|---|
| JP | 10-117362 | 5/1998 |
| JP | 2010-193409 | 9/2010 |

*Primary Examiner* — Jay Patel
*Assistant Examiner* — Joseph Suh
(74) *Attorney, Agent, or Firm* — K&L Gates LLP (57) ABSTRACT

Disclosed herein is an image processing apparatus, including: a projection section adapted to alternately project an image for a right eye and another image for a left eye; a separation section adapted to separate a projected image of the right eye image and another projected image of the left eye image from each other; a gaze detection section adapted to detect a gaze direction of an observer to which the right eye image and the left eye image are to be given; and a luminance adjustment section adapted to set a range with respect to the gaze direction to the right eye image and the left eye image and adjust a luminance value of pixels so that a portion of the right and left eye images other than the set range exhibits an invisible state.

9 Claims, 9 Drawing Sheets

(56) References Cited

U.S. PATENT DOCUMENTS

| | | | |
|---|---|---|---|
| 2005/0131857 A1* | 6/2005 | Fujiki et al. | 707/1 |
| 2005/0237485 A1* | 10/2005 | Blum et al. | 351/168 |
| 2006/0017657 A1* | 1/2006 | Yamasaki | 345/8 |
| 2006/0053873 A1* | 3/2006 | Ganassi et al. | 73/116 |
| 2006/0061544 A1* | 3/2006 | Min et al. | 345/156 |
| 2007/0132663 A1* | 6/2007 | Iba et al. | 345/8 |
| 2008/0238921 A1* | 10/2008 | Lehenbauer et al. | 345/426 |
| 2009/0040402 A1* | 2/2009 | Tomita et al. | 349/15 |
| 2009/0115865 A1* | 5/2009 | Kamada et al. | 348/222.1 |
| 2009/0217315 A1* | 8/2009 | Malik et al. | 725/9 |
| 2009/0248036 A1* | 10/2009 | Hoffman et al. | 606/130 |
| 2009/0292223 A1* | 11/2009 | Sugio et al. | 600/558 |
| 2009/0295812 A1* | 12/2009 | Aoki et al. | 345/522 |
| 2010/0033333 A1* | 2/2010 | Victor et al. | 340/576 |
| 2010/0060548 A1* | 3/2010 | Choi et al. | 345/1.3 |
| 2010/0177172 A1* | 7/2010 | Ko et al. | 348/53 |
| 2010/0188415 A1* | 7/2010 | Pettigrew et al. | 345/589 |
| 2010/0199232 A1* | 8/2010 | Mistry et al. | 715/863 |
| 2010/0277952 A1* | 11/2010 | Chien | 362/641 |
| 2011/0007132 A1* | 1/2011 | Redmann et al. | 348/42 |
| 2011/0080401 A1* | 4/2011 | Tan et al. | 345/419 |
| 2011/0115624 A1* | 5/2011 | Tran | 340/540 |
| 2011/0149098 A1* | 6/2011 | Ahn et al. | 348/222.1 |
| 2011/0216175 A1* | 9/2011 | Shimoyama et al. | 348/56 |
| 2012/0019670 A1* | 1/2012 | Chang et al. | 348/189 |
| 2012/0065860 A1* | 3/2012 | Isaji et al. | 701/70 |
| 2012/0081554 A1* | 4/2012 | Berman et al. | 348/207.1 |

* cited by examiner

IMAGE PROCESSING APPARATUS IMAGE PROCESSING METHOD AND PROGRAM USING ELECTRODES CONTACTING A FACE TO DETECT EYE GAZE DIRECTION

CROSS REFERENCES TO RELATED APPLICATIONS

The present application claims priority to Japanese Priority Patent Application JP 2010-229770 filed in the Japan Patent Office on Oct. 12, 2010, the entire content of which is hereby incorporated by reference.

BACKGROUND

The present application relates to an image processing apparatus, an image processing method and a program, and is suitable for use with, for example, a case in which a three-dimensional image is presented.

A technique is available in which an image for the right eye and an image for the left eye having a parallax therebetween are alternately given to the eyes of the observer to present a three-dimensional image to the observer (refer to Japanese Patent Laid-Open No. Hei 10-117362 and Japanese Patent Laid-Open No. 2010-193409). With the present technique, a person in a video image can look three-dimensionally, and therefore, the reality is enhanced.

SUMMARY

Incidentally, on a video image regarding a game or the like, a point of view of the user is sometimes likened and displayed as an image. In such a case as just described, as one of countermeasures for the enhancement of the reality, it is sometimes requested for a image to provide such a feeling of presence that the user actually is at the place to the user while the point of view of the user is likened as an image.

It is desirable to provide an image processing apparatus, an image processing method and a program which can enhance the reality.

According to an embodiment, there is provided an image processing apparatus including a projection section adapted to alternately project an image for a right eye and another image for a left eye, a separation section adapted to separate a projected image of the right eye image and another projected image of the left eye image from each other, a gaze detection section adapted to detect a gaze direction of an observer to which the right eye image and the left eye image are to be given, and a luminance adjustment section adapted to set a range with respect to the gaze direction to the right eye image and the left eye image and adjust a luminance value of pixels so that a portion of the right and left eye images other than the set range exhibits an invisible state.

According to another embodiment, there is provided an image processing method, including detecting a gaze direction of an observer to which an image for a right eye and another image for a left eye are to be given, setting a range with reference to the gaze direction to the right eye image and the left eye image and adjusting a luminance value of pixels so that a portion of the right and left eye images other than the set range exhibits an invisible state, alternately projecting the adjusted right eye image and left eye image, and separating a projected image of the right eye image and another projected image of the left eye image from each other.

According to a further embodiment, there is provided a program for causing a computer to execute detecting a gaze direction of the observer to which an image for a right eye and a image for a left eye are to be given, setting a range with reference to the gaze direction to the right eye image and the left eye image and adjusting a luminance value of pixels so that a portion of the right and left eye images other than the set range exhibits an invisible state, alternately projecting the adjusted right eye image and left eye image, and separating a projected image of the right eye image and another projected image of the left eye image from each other.

With the disclosed technology, the noticed region of the observer is limited around a gaze direction, and a three-dimensional image approximate to an actual view field at a dark place at night or the like can be presented to the observer. As a result, the reality can be enhanced by the image processing apparatus, image processing method and program.

Additional features and advantages are described herein, and will be apparent from the following Detailed Description and the figures.

DETAILED DESCRIPTION

Embodiments of the present application will be described below in detail with reference to the drawings.
1. Embodiment
2. Other Embodiments

1. Embodiment

Presentation methods of a three-dimensional image can be roughly divided into a time division method and a polarization method. In the time division method, an image for the right eye and an image for the left eye having a parallax therebetween are projected alternately along a time series, and the transmission timing for liquid crystal shutters allocated to the left and right eyes is changed over to present the three-dimensional image.

On the other hand, in the polarization method, an image for the right eye and an image for the left eye whose polarization directions are different from each other are projected alternately along a time series and a three-dimensional image is presented through lenses to which polarization directions corresponding to the left and right eyes are allocated.

As an embodiment, a picture presentation system which uses a time division method is described as an example.

1-1. Configuration of the Picture Presentation System

Figure 1:
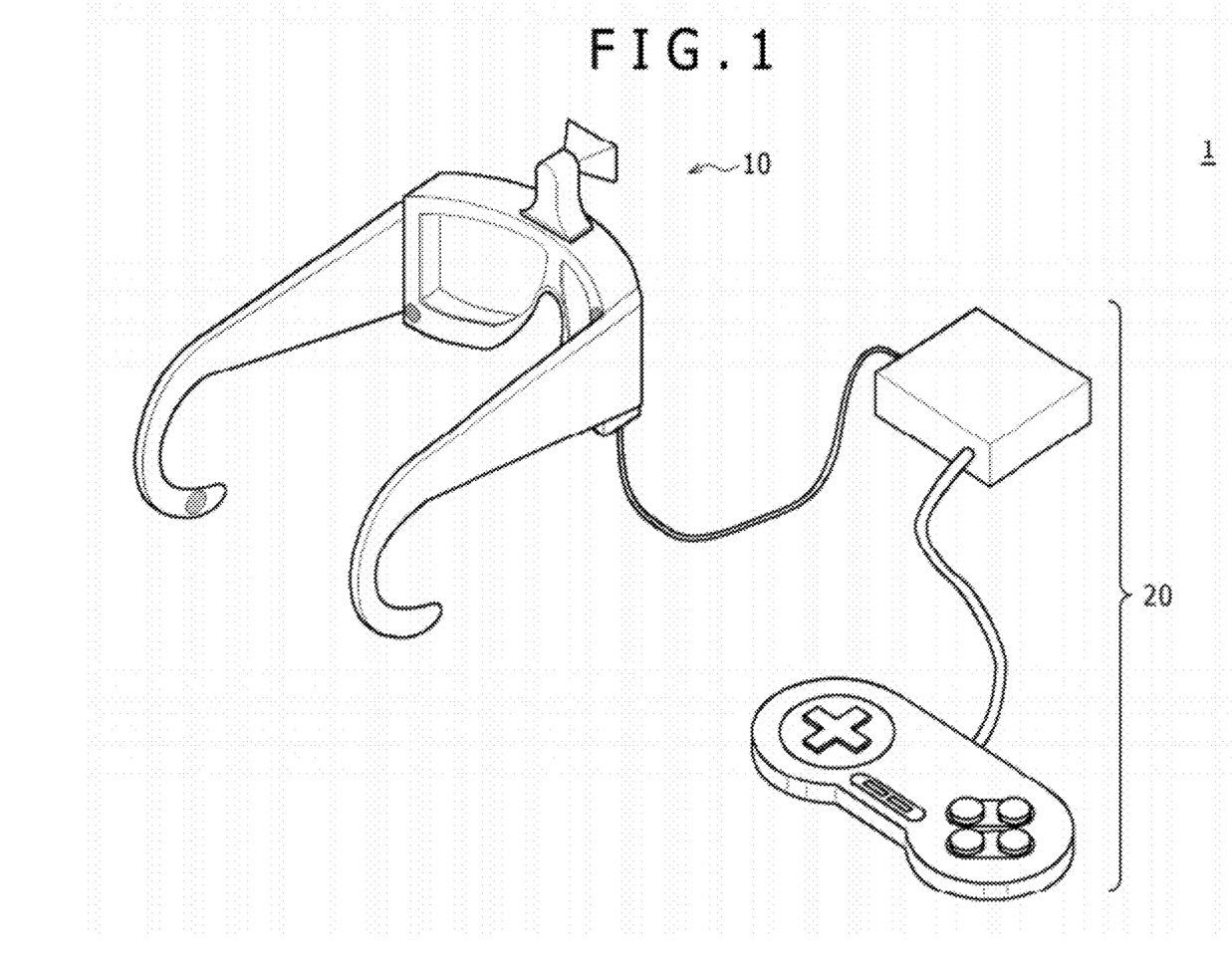
FIG. 1 is a schematic view showing a configuration of a video image presentation system.

Referring first to FIG. 1, a picture presentation system 1 is shown and includes eyeglasses 10 and an image processing apparatus 20. The eyeglasses 10 and the image processing apparatus 20 are configured such that they can transmit and receive data to and from each other by wire communication or wireless communication.

1-2. Configuration of the Eyeglasses

Figure 2A:
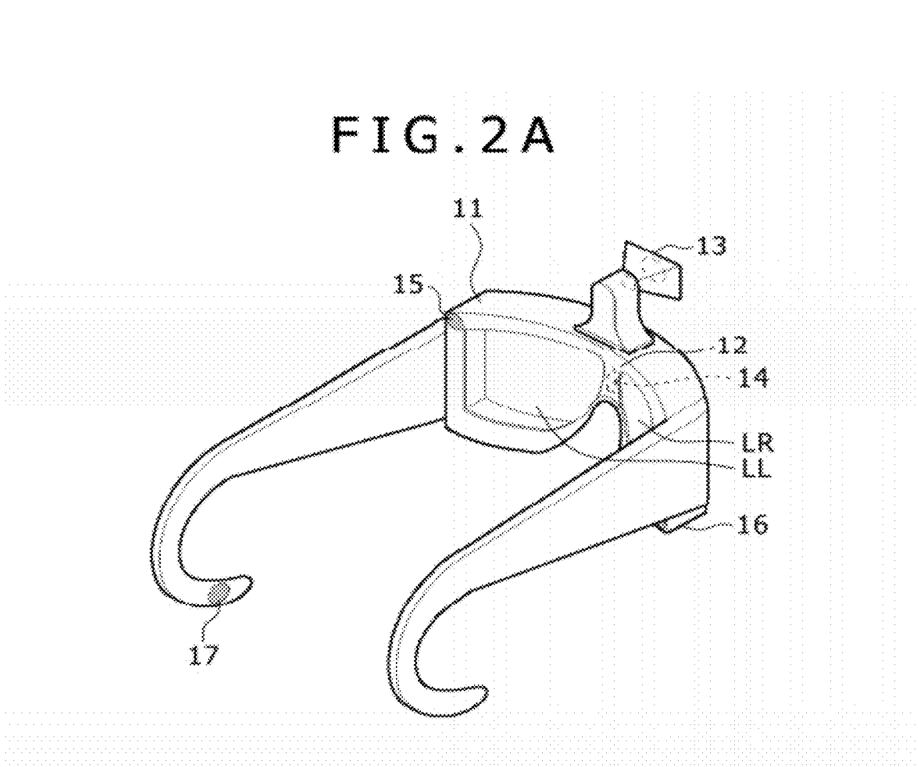
FIGS. 2A and 2B are schematic views showing a configuration of eyeglasses.
Figure 2B:
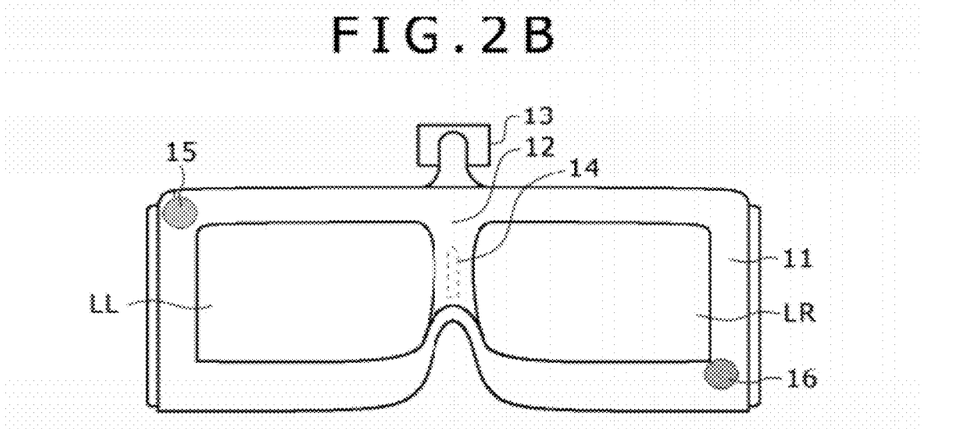
Figure 3:
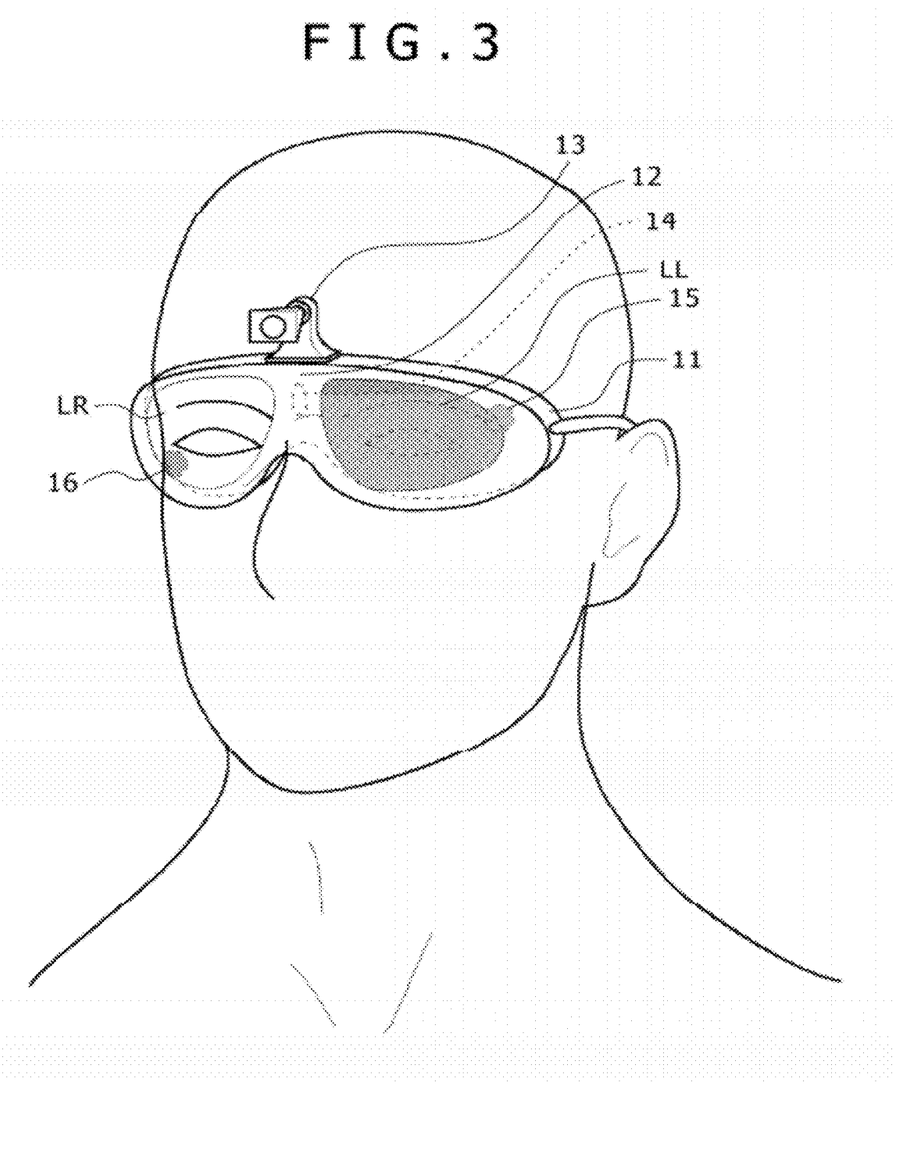
FIG. 3 is a schematic view showing a worn state of the eyeglasses.

Referring now to FIGS. 2A, 2B and 3, the eyeglasses 10 include a frame (hereinafter referred to as eyeglass frame) 11, and a liquid crystal shutter LL allocated to the left eye and a liquid crystal shutter LR allocated to the right eye are provided at predetermined positions of the eyeglass frame 11.

A projection section 13 is mounted on the upper side of a bridge section 12 disposed between the liquid crystal shutters LL and LR of the eyeglass frame 11. The projection section 13 projects an image toward a forward direction orthogonal to a liquid crystal plane. Further, a three-axis gyroscope 14 is built in a bridge section BLP.

An electrode (hereinafter referred to sometime as left upper electrode) 15 for contacting with a left upper side portion of the face with respect to the left eye and another electrode (hereinafter referred to sometime as right lower electrode) 16 for contacting with a right lower side portion of face with respect to the right eye are provided on the side of the eyeglass frame 11 which opposes to the face.

As a position of the face with which the left upper electrode 15 is to contact, a portion around the tail of the left eyebrow of the user who wears the eyeglass frame 11 is more preferable. On the other hand, as a position of the face with which the right lower electrode 16 is to contact, a portion below the tail of the right eyebrow of the user who wears the eyeglass frame 11 is preferable.

Further, an electrode (hereinafter referred to sometime as ear electrode) 16 for contacting a portion of the face around one ear is provided on the inner side of a temple of the eyeglass frame 11. As a position of the face with which the ear electrode 17 is to contact, a portion of the user below a portion at which the user wears the eyeglass frame 11 is preferable. It is more preferable if the position is an earlobe.

It is to be noted that, if the electrodes 15 to 17 can contact with various portions of the user who wears the eyeglass frame 11, then the installation form between the eyeglass frame 11 and the electrodes 15 to 17 is not limited to the shown form.

1-3. Configuration of the Image Processing Apparatus

Figure 4:
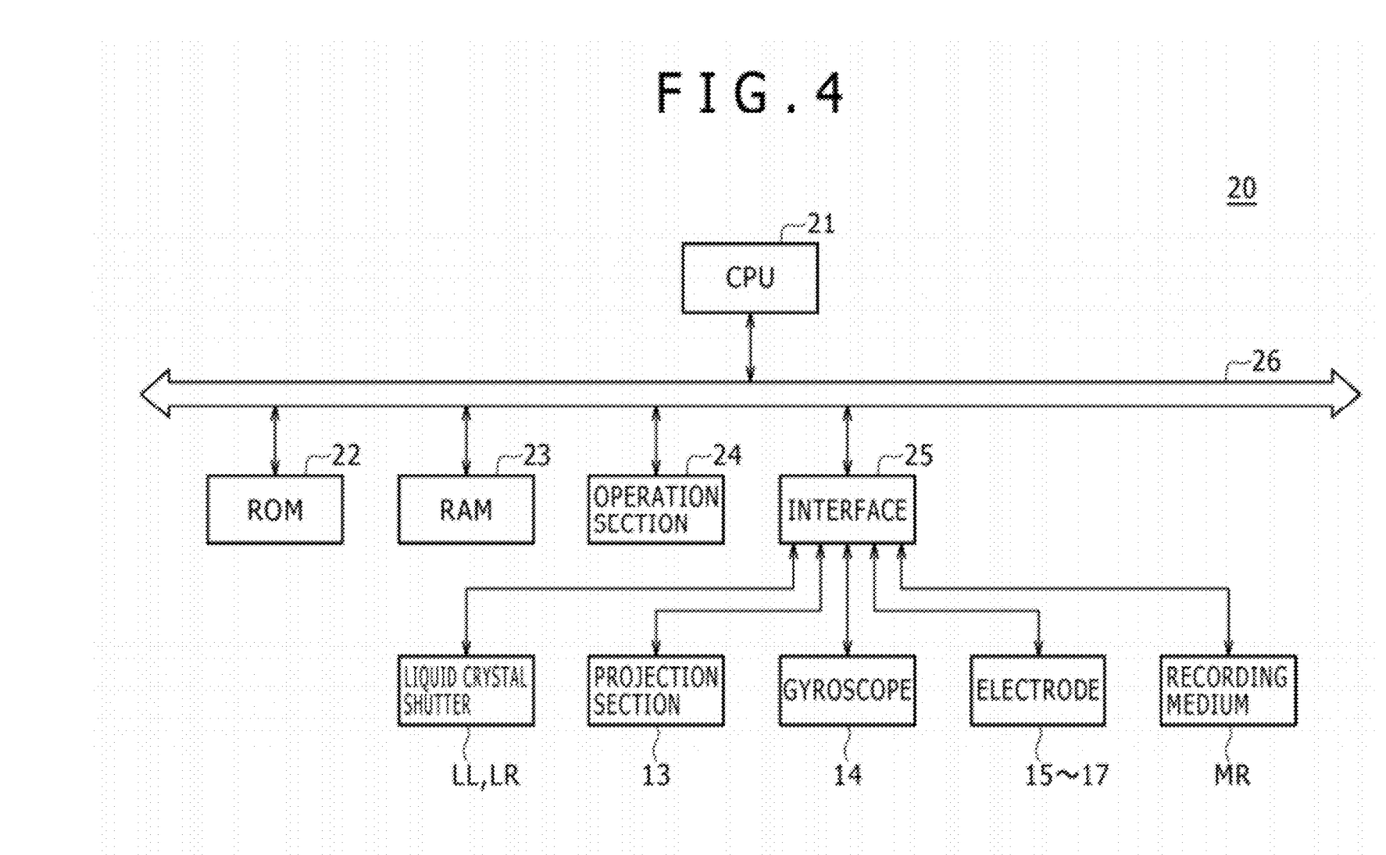
FIG. 4 is a block diagram showing a configuration of an image processing apparatus.

Referring to FIG. 4, the image processing apparatus 20 is configured by connecting various kinds of hardware to a CPU (Central Processing Unit) 21 for controlling the entire image processing apparatus 20.

In particular, a ROM (Read Only Memory) 22, a RAM (Random Access Memory) 23 which functions as a work memory of the CPU 21, an operation section 24 and an interface 25 are connected to the CPU 21 through a bus 26.

A program for suitably using the liquid crystal shutters LL and LR, projection section 13, gyroscope 14 and electrodes 15 to 17 to present a three-dimensional image to the user is stored in the ROM 22.

The operation section 24 has various operation elements and provides an instruction corresponding to an operation of the operation elements by the user to the CPU 21. The instruction relates to control of the three-dimensional image such as, for example, movement of a person included in a three-dimensional image or a three-dimensional image itself backwardly, forwardly, leftwardly or rightwardly, changing of a state of a three-dimensional image or the like.

The liquid crystal shutters LL and LR, projection section 13, gyroscope 14, and electrodes 15 to 17 as well as a recording medium MR are connected to the interface 25. The recording medium MR is, for example, a Blu-ray (Blu-ray Disc Association:®) disk, a hard disk, a memory card or the like.

1-4. Picture Presentation Process

Figure 5:
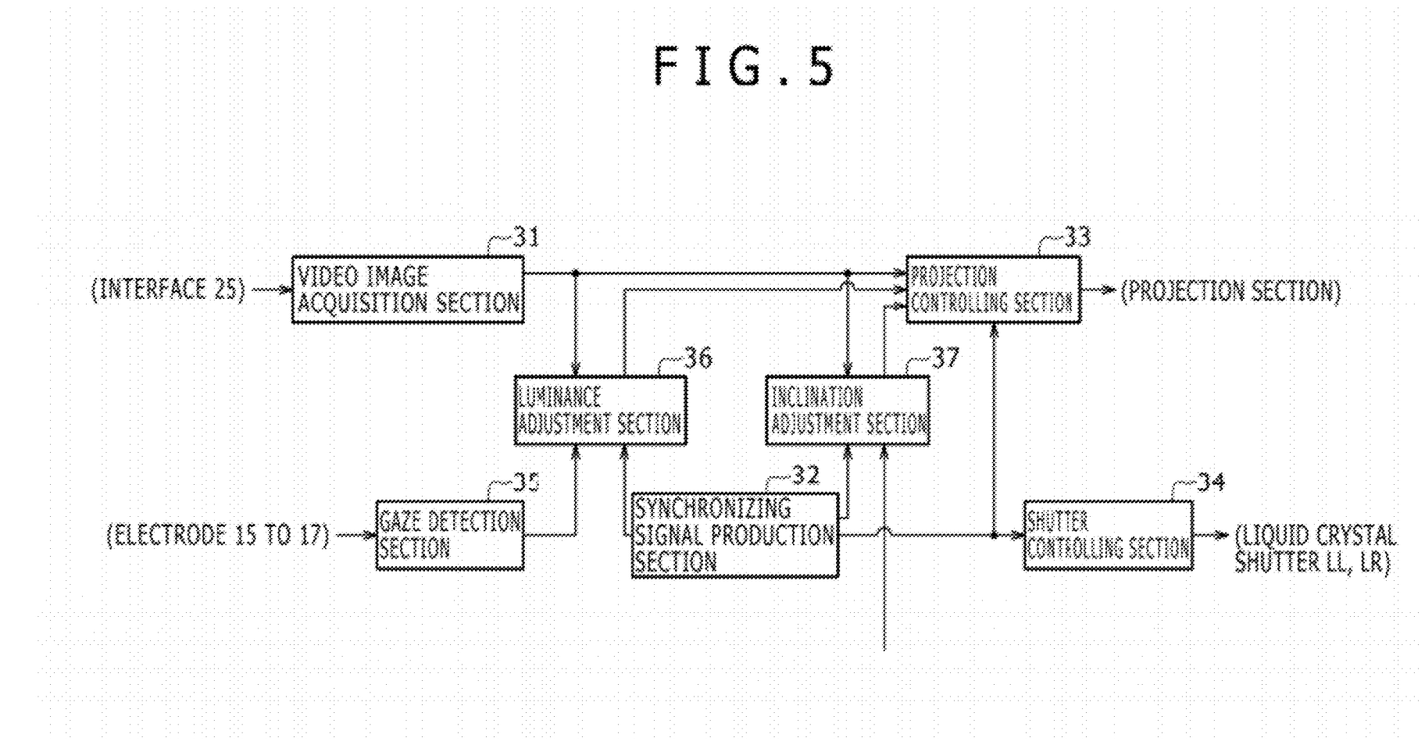
FIG. 5 is a block diagram showing a functional configuration of a CPU.

In the case where an instruction to present a video image is received, the CPU 21 develops the program stored in the ROM 22 into the RAM 23. Referring now to FIG. 5, the CPU 21 functions, based on the program, as a video image acquisition section 31, a synchronizing signal production section 32, a projection controlling section 33, a shutter controlling section 34, a gaze detection section 35, a luminance adjustment section 36 and an inclination adjustment section 37. The CPU 21 thus executes a process for presenting a three-dimensional image to the user.

The video image acquisition section 31 acquires video image data from the recording medium MR through a wire or wireless communication path using the interface 25 and transmits the acquired data to the projection controlling section 33. The video image data indicate a plurality of images along a time series such that an image for the right eye and an image for the left eye having a parallax therebetween make a unit.

The synchronizing signal production section 32 produces a signal (hereinafter referred to as synchronizing signal) for synchronization control and transmits the produced signal to the projection controlling section 33, shutter controlling section 34, luminance adjustment section 36 and inclination adjustment section 37.

The projection controlling section 33 controls the projection section 13 to project a plurality of right eye images and left eye images which configure the video image data given from the video image acquisition section 31 along a time series in accordance with the synchronizing signal supplied thereto from the synchronizing signal production section 32.

The shutter controlling section 34 alternately changes over opening and closing of the liquid crystal shutters LL and LR in accordance with the synchronizing signal supplied thereto from the synchronizing signal production section 32 such that the right eye image and the left eye image are given to the right eye and the left eye, respectively.

By the gaze detection section 35, a gaze direction is detected from a potential difference of the left upper electrode 15 and another potential difference of the right lower electrode 16 from the ear electrode 17.

Figure 6:
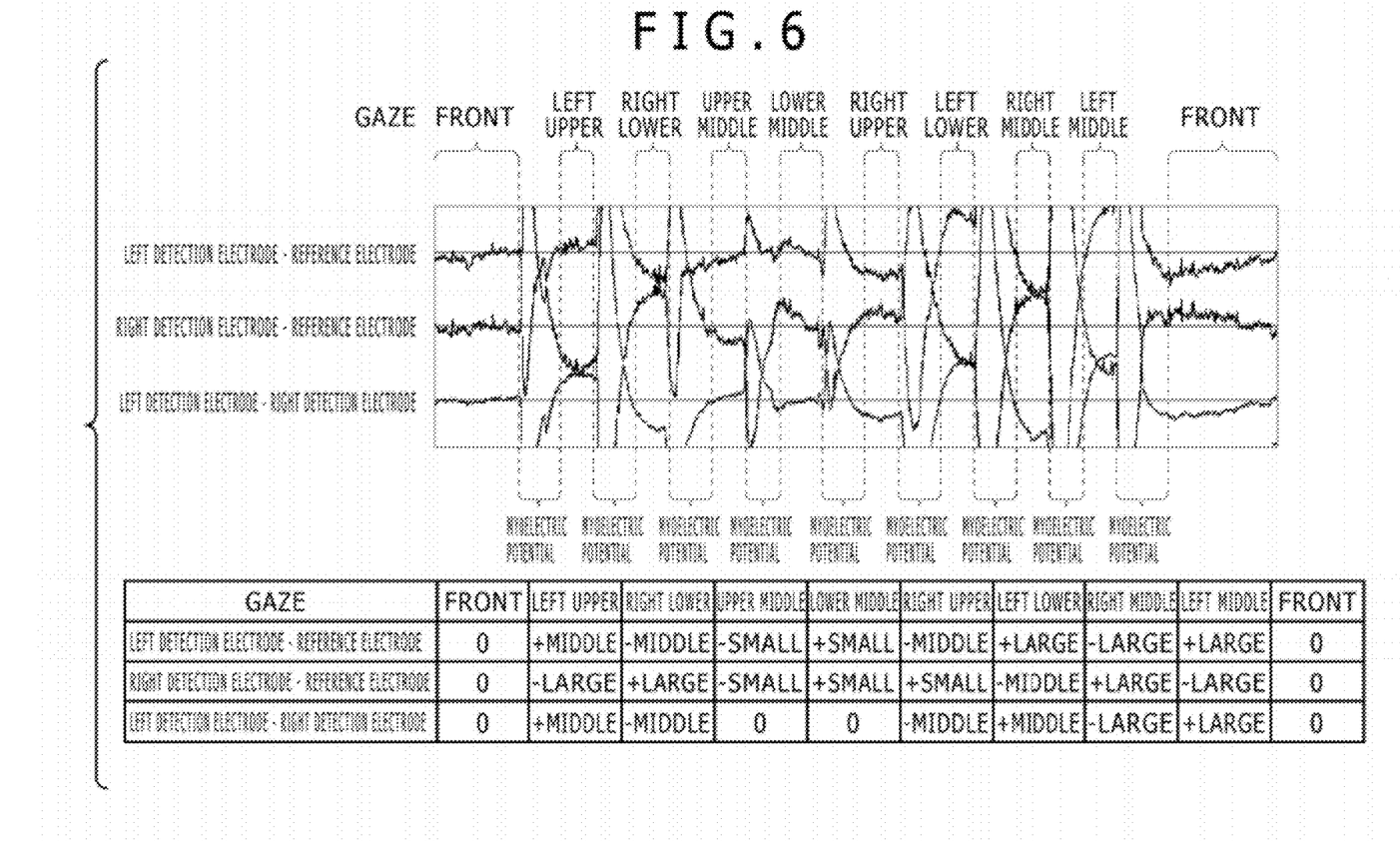
FIG. 6 is a schematic view illustrating a relationship of a gaze to the sign and the magnitude of a potential difference.

A result of an experiment is illustrated in FIG. 6 in the case, when a gaze was moved in various directions in a state in which the reference electrode was disposed on the left earlobe and the other electrodes are disposed individually at a left upper portion with respect to the left eye and a right lower portion with respect to the right eye, the potential difference between the electrodes and the reference electrode and the potential difference between the electrodes were measured.

In this measurement, the gaze was moved in order from the front to left upper, right lower, upper middle, lower middle, right upper, left lower, right middle, left middle to front, and the gaze was stopped at the individual positions for predetermined time. As seen in FIG. 4, when the gaze stops in the various directions, the sign and the magnitude are different depending upon the direction, in which the gaze stops, in regard to the potential difference between the left upper electrode and the reference electrode, the potential difference between the right lower electrode and the reference electrode and the potential difference between the left upper electrode and the right lower electrode.

It is to be noted that, since a myoelectric potential when the gaze is moved is measured, the potential differences, which correspond to an eye potential, vary by a great amount upon movement of the gaze as shown in FIG. 6. Since the myoelectric potential has a magnitude of approximately 1000 times as high as the eye potential, the myoelectric potential and the eye potential can be easily distinguished.

The gaze detection section 35 amplifies the potential difference between the ear electrode 17 which is used as the reference and the left upper electrode 15 and amplifies the potential difference between the ear electrode 17 and the right lower electrode 16. Then, the gaze detection section 35 compares the values of the amplified potential differences and a threshold value defined as the lowest value, which is to be determined as a myoelectric potential, after every predetermined interval of time.

If both of the values of the potential difference between the ear electrode 17 and the left upper electrode 15 (the potential difference is hereinafter referred to sometime as left potential difference) and the potential difference between the ear electrode 17 and the right lower electrode 16 (the potential difference is hereinafter referred to sometime as right potential difference) are equal to or higher than the threshold value, then the gaze detection section 35 decides that the gaze is not to be detected.

On the other hand, if the left potential difference and the right potential difference are lower than the threshold value, then the gaze detection section 35 detects the gaze direction corresponding to the sign and the magnitude of the left potential difference and the right potential difference with reference to a table.

In particular, for example, determining the nine different gaze directions as a detection object, it is decided to which one of three different magnitudes of "great," "middle" and "small" the sign and the magnitude of the left potential difference and the right potential difference belong. Then, a result of the decision and such a table which indicates a sign and a magnitude in the nine gaze directions as shown in FIG. 4 are compared with each other. It is to be noted that the nine gaze directions include "front," "upper middle," "lower middle," "right middle," "left middle," "right upper," "right lower," "left upper" and "left lower" directions.

If the gaze direction is detected, then the gaze detection section 35 produces data (hereinafter referred to sometime as gaze data) which indicates the gaze direction and transmits the produced data to the luminance adjustment section 36.

In the case where the gaze data is received from the gaze detection section 35, the luminance adjustment section 36 recognizes the right eye image and the left eye image corresponding to a point of time at which the gaze direction indicated by the gaze data is detected as an adjustment object based on the synchronizing signal supplied thereto from the synchronizing signal production section 32 and a built-in clock.

Then, the luminance adjustment section 36 sets a range with respect to the gaze direction to the right eye image and the left eye image recognized as the adjustment object and changes the luminance value of pixels in a region outside the set range to a value lower than a predetermined value so that the region outside the set range exhibits an invisible state.

Further, the luminance adjustment section 36 changes the luminance value of the pixels in the range so as to increase the reduction ratio for the luminance value as the distance from the center increases so that the set range gets darker gradually from the center thereof.

Figure 7:
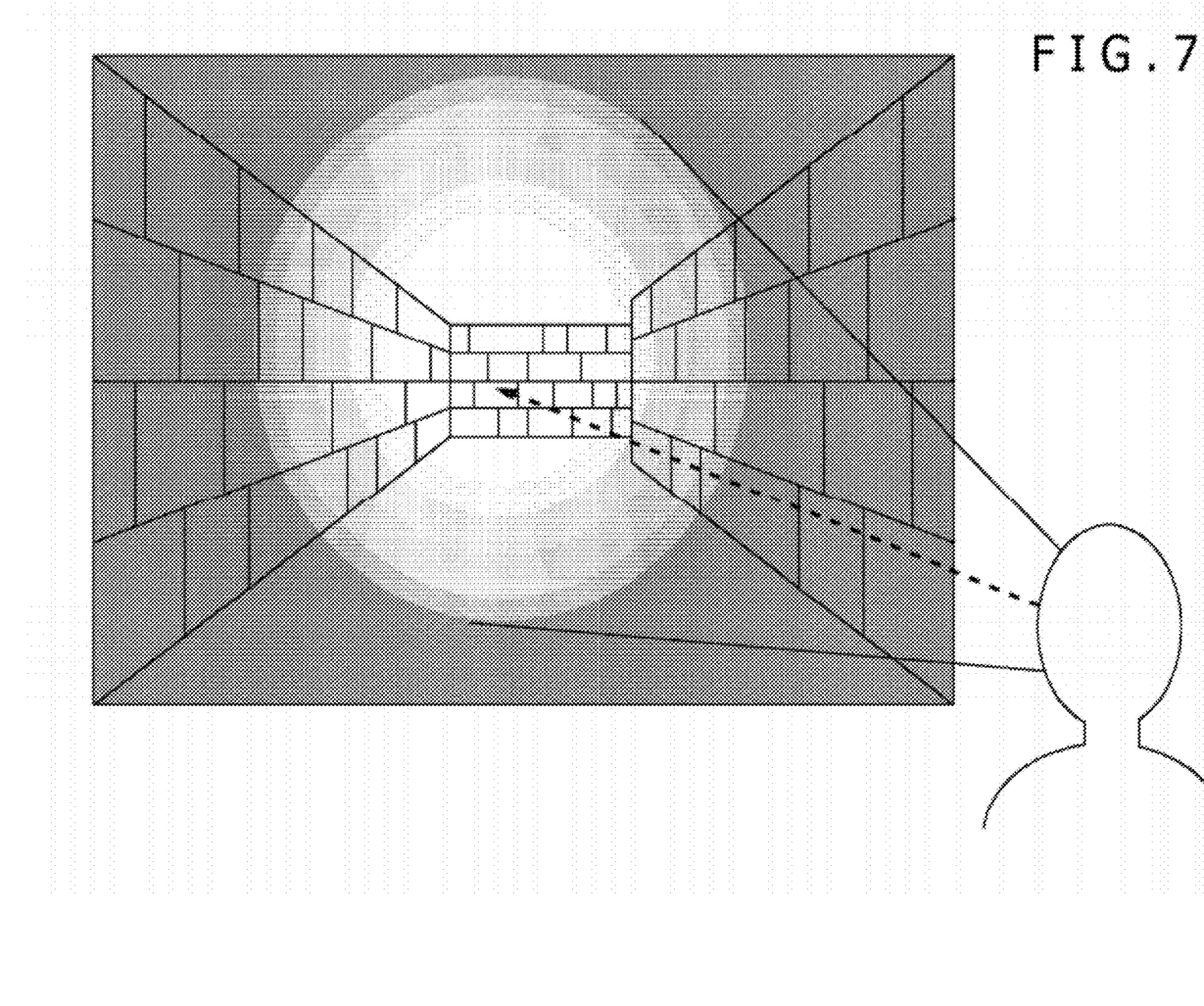
FIGS. 7 and 8 are schematic views showing different examples of a presentation state of a projected image.

As a result, as seen in FIG. 7, the noticed region of the user is limited around the gaze direction and a three-dimensional image approximate to an actual view field at a dark place at night or the like can be presented.

The inclination adjustment section 37 acquires, as reference data, a measurement value by the gyroscope 14 in a state in which the eyeglass frame 11 is suitably worn. As an acquisition method of the reference data, for example, a method in which the reference data is read out and acquired from a ROM or the like in which it is stored in advance and another method in which a measurement value by the gyroscope 14 at a point of time at which wearing of the eyeglass frame 11 is detected is produced and acquired as the reference data are available.

If the reference data is acquired, then the inclination adjustment section 37 periodically compares the reference data with the measurement value outputted from the gyroscope 14 to detect the inclination angle with respect to the reference plane from a result of the comparison.

Here, in the case where the detected inclination angle is equal to or greater than the lowest value set for an inclination, the inclination adjustment section 37 recognizes the right eye image and the left eye image corresponding to a time point of the detection as the adjustment object based on the synchronizing signal supplied thereto from the synchronizing signal production section 32 and the built-in clock.

Then, the inclination adjustment section 37 corrects the inclination of the right eye image and the left eye image which are an adjustment object so that the inclination angle becomes smaller than the predetermined angle.

Figure 8:
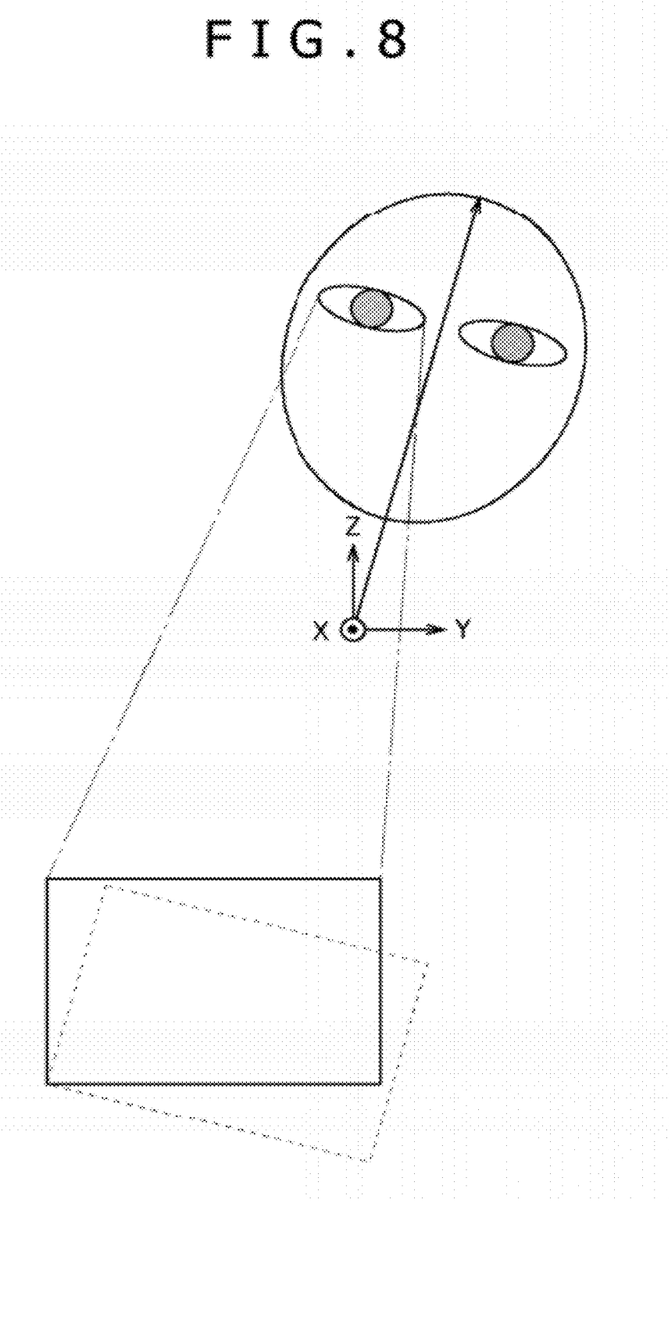

As a result, as seen in FIG. 8, such a situation that a projection image is inclined in response to the inclination of the head of the user who wears the eyeglass frame 11 is avoided and a three-dimensional image which coincides with an actual view field state is presented.

In this manner, the CPU 21 uses the electrodes 15 to 17 and the gyroscope 14 to correct the right eye image and the left eye image so as to be approximate to an actual view field at a dark place and coincide with an actual view field state to present a three-dimensional image.

1-5. Three-Dimensional Image Presentation Processing Procedure

Figure 9:
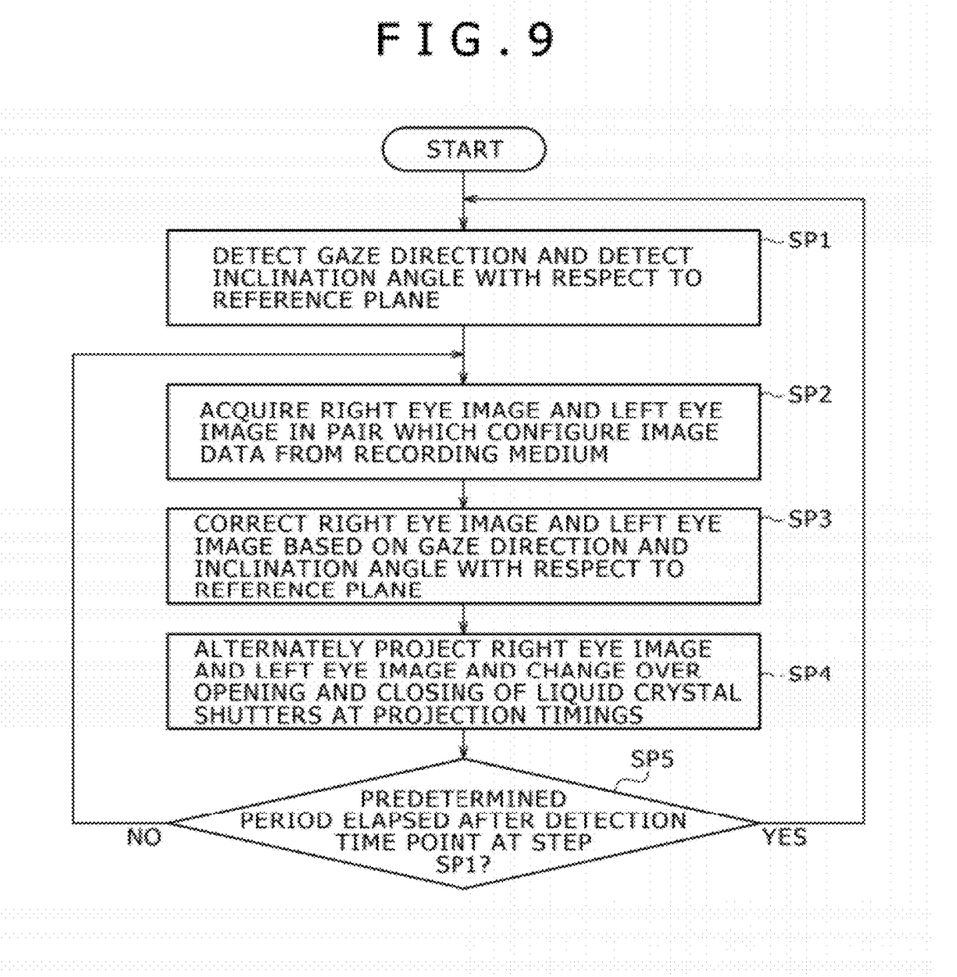
FIG. 9 is a flow chart illustrating a video image presentation processing procedure.

Now, a procedure of the three-dimensional image presentation process described above is described with reference to a flow chart shown in FIG. 9. If an instruction to present a video image is received, then the CPU 21 starts the three-dimensional image presentation process and advances its processing to step SP1.

At step SP1, the CPU 21 detects the gaze direction using the electrodes 15 to 17 and detects the inclination angle with respect to the reference plane using the gyroscope 14 and then advances the processing to step SP2.

At step SP2, the CPU 21 acquires an image for the right eye and an image for the left eye in pair which configure video image data from the recording medium MR and advances the processing to step SP3.

At step SP3, the CPU 21 corrects the right eye image and the left eye image acquired at step SP2 based on the gaze direction and the inclination angle with respect to the reference plane detected at step SP1 and advances the processing to step SP4. In particular, the luminance value of the right eye image and the left eye image is corrected so that the predetermined range with respect to the gaze direction detected at step SP1 is visualized, and the inclination of the right eye image and the left eye image is corrected so that the difference from the inclination angle with respect to the reference plane detected at step SP1 is smaller than a predetermined amount.

At step SP4, the CPU 21 alternately projects the right eye image and the left eye image corrected at step SP3 and changes over opening and closing of the liquid crystal shutters LL and LR in an accordance with the projection period, and advances the processing to step SP5.

At step SP5, the CPU 21 decides whether or not a predetermined period elapses after a detection time point at step SP1. If the predetermined period does not elapse, then the CPU 21 returns the processing to step SP2, at which it acquires new pair of an image for the right eye image and an image for the left eye from the recording medium MR.

On the other hand, if the predetermined period elapses after the detection time point at step SP1, then the CPU 21 returns the processing to step SP1, at which it detects the gaze direction and the inclination angle with respect to the reference plane again.

In this manner, the CPU 21 presents a three-dimensional image based on the video image data stored in the recording medium MR until an instruction for ending presentation of a video image is received.

It is to be noted that the gaze direction is not sometimes detected at step SP1 due to movement of the gaze. In this instance, at step SP3, the luminance value of the right eye image and the left eye image which are an acquisition object at present is corrected similarly to the luminance value corrected for the right eye image and the left eye image acquired before the images acquired at present.

Further, if the inclination angle with respect to the reference plane is smaller than the lowest value set for a minimum inclination at step SP1, then at step SP3, the inclination of the right eye image and the left eye image which are an acquisition object at present is corrected similarly to the inclination corrected for the right eye image and the left eye image acquired before the images acquired at present.

1-6. Effect and So Fourth

The image processing apparatus 20 having the configuration described above detects the gaze direction of the user to which a three-dimensional image is to be presented and sets a range with respect to the gaze direction in an image for the right eye to be given to the right eye of the user and an image for the left eye to be given to the left eye of the user. Then, the image processing apparatus 20 adjusts the luminance value of pixels in a portion of the image for the right eye and the left eye other than the set range so that the portion exhibits an invisible state.

Accordingly, the image processing apparatus 20 can present a three-dimensional image whose noticed region of the user is limited around the gaze direction and which is approximate to an actual view field in a dark place at night or the like. This is specifically suitable for a case in which a screen image such as a three-dimensional image in a game or the like is perceived as a view field of the user to present a three-dimensional image.

Further, the image processing apparatus 20 detects the inclination angle with respect to the reference plane based on a measurement value by the gyroscope and adjusts the inclination of the right eye image and the left eye image so that the inclination angle becomes smaller than a predetermined angle.

Accordingly, the image processing apparatus 20 can avoid such a situation that a projection image is inclined in accordance with the inclination of the head of the user who wears the eyeglass frame 11 and can present a three-dimensional image which coincides with an actual view field state to the user. This is specifically suitable for a case in which the projection section 13 for projecting an image to be observed by the observer is provided on an apparatus such as the eyeglass frame 11 to be worn on the observer.

With the configuration described above, by implementing presentation of a three-dimensional image which is approximate to an actual view field or another three-dimensional image which coincides with an actual view field state, the image processing apparatus 20 can enhance the reality.

2. Other Embodiments

In the embodiment described above, the liquid crystal shutters LL and LR are applied as a section for separating the projection images for the right eye image and the left eye image to the corresponding eyes. However, the separation section is not limited to that in the embodiment described above. For example, a lenticular screen or the like can be applied. Further, in the case where the optical polarization method is applied in place of the time division method, a liquid crystal lens or the like serving as a polarization filter can be applied in place of the liquid crystal shutters LL and LR.

It is to be noted that, while, in the time division method, the luminance value and inclination of the right eye image and the left eye image before projection are corrected, in the light polarization method, the polarization direction of a liquid crystal lens is adjusted to correct the luminance value and inclination of the right eye image and the left eye image to be projected.

Further, in the embodiment described above, the gaze direction is detected from the potential difference between the electrodes 15 and 16 and the electrode 17. However, the detection section of the gaze direction is not limited to that in the embodiment described above. For example, the gaze direction may be detected from an image obtained as a result of image pickup by an image pickup section for picking up an image of the eyes of the user to which the right eye image and the left eye image are to be given. Particularly, as a detection method of the gaze direction from an image, a method is available in which the gaze direction is detected, for example, based on a dispersion amount at the center of the eyes with respect to the center of an eye region sandwiched by lids.

Further, in the embodiment described above, the nine directions of "front," "upper middle," "lower middle," "right middle," "left middle," "right upper," "right lower," "left upper" and "left lower" are applied taking the gaze direction as the detection object. However, the gaze direction of the detection object is not limited to those in the embodiment described above, and various numbers of the detection object can be applied.

Further, in the embodiment described above, the magnitude of the left potential difference and the right potential difference is classified into three stages. However, the number of stages for classifying the magnitude is not limited to that in the embodiment described above, and various numbers of the stages can be applied.

Further, in the embodiment described above, the shape of the range with reference to the gaze direction is formed as a circular shape. However, the shape of the range is not limited to the circular shape, but various shapes can be applied.

Further, in the embodiment described above, the sign and the magnitude of the left potential difference and the right potential difference and the table which indicates the sign and magnitude in the nine gaze directions are compared with each other to detect the gaze direction. However, the detection method for the gaze direction is not limited to that in the embodiment described above, and, for example, a method in which the gaze direction is directly detected by calculation from the sign and the magnitude of the left potential difference and the right potential difference or the like may be applied.

Further, in the embodiment described above, the eyeglass frame 11 is applied as a wearing section or apparatus which the user can wear. However, the wearing section is not limited to that in the embodiment described above. Various apparatus such as, for example, a hair band, a cap or the like can be applied.

Further, in the embodiment described above, the left upper portion with respect to the left eye and the right lower portion with respect to the right eye are applied as portions with which an electrode is to contact. However, the portion with which an electrode is to contact is not limited to the left upper portion of the left eye and the right lower portion of the right eye if the gaze in the upward and downward direction and the leftward and rightward direction can be detected. Further, while the number of the electrodes to contact with the proximity of the eyes in the embodiment described above is one electrode for each of the eyes, two or more electrodes may be used.

Further, in the embodiment described above, the program for executing the video image presentation process is stored in the ROM. However, the storage place of the program is not limited to that in the embodiment described above. Various kinds of the storage medium on the outside or the inside of the image processing apparatus 20 can be applied.

The present application can be applied to a game industry, a medical industry and so forth.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus, comprising:
   a wearing unit having an eyeglass frame, the eyeglass frame including a pair of temple portions;
   a first electrode configured to contact a right side of a face, the first electrode being provided on a side of the wearing unit opposing the face;
   a second electrode configured to contact a left side of the face, the second electrode being provided on the side of the wearing unit opposing the face;
   a reference electrode adapted to measure a potential to be used as a reference;
   a gyroscope provided on the wearing unit; and
   an inclination adjustment section adapted to detect an inclination angle with respect to a reference plane based on a measured value by the gyroscope and adjust the inclination of a right eye image and a left eye image so that the inclination angle becomes smaller than a predetermined angle,
   wherein data outputted from the first electrode, the second electrode, and the reference electrode, is input into a gaze detection unit and used for detecting a gaze direction of a wearer from potential differences, and
   wherein the gaze detection unit determines whether a potential difference between the first electrode and the reference electrode is below a threshold of a myoelectric potential and determines whether a potential difference between the second electrode and the reference electrode is below the threshold of the myoelectric potential, and based on determining that the potential difference between the first electrode and the reference electrode is below the threshold of the myoelectric potential and determining that the potential difference between the second electrode and the reference electrode is below a the threshold of a the myoelectric potential, the gaze detection unit detects the gaze direction of the wearer using only potential differences determined based on the data outputted from the first electrode, the second electrode, and the reference electrode.

2. The information processing apparatus according to claim 1, wherein the gaze detection unit detects the gaze direction corresponding to at least one of a sign and a magnitude of a left potential difference and a right potential difference with reference to a table.

3. The information processing apparatus according to claim 1, wherein the reference electrode is configured to contact a portion around an ear and is provided on the inner side of a temple portion.

4. The information processing apparatus according to claim 1, further comprising:
   a projection section adapted to alternately project an image for a right eye and another image for a left eye; and
   a luminance adjustment section adapted to set a range with respect to the gaze direction to a right eye image and a left eye image and adjust a luminance value of pixels so that a portion of the right and left eye images other than the set range exhibits an invisible state.

5. The information processing apparatus according to claim 1, further comprising:
   a luminance adjustment section adapted to set a range with respect to the gaze direction to the image and adjust a luminance value of pixels so that a portion of right and left eye images of the set range exhibits an visible state.

6. The information processing apparatus according to claim 1, wherein the first electrode, the second electrode, and the reference electrode are configured to transmit and receive data by wireless communication.

7. The information processing apparatus according to claim 1, wherein the gaze detection section amplifies a potential difference between the first electrode and the reference electrode and amplifies a potential difference between the second electrode and the reference electrode, and the gaze detection section compares values of the amplified potential differences and a threshold value defined as a lowest value which is to be determined as a myoelectric potential, after every predetermined interval of time.

8. An information processing method, comprising:
   receiving data outputted from a first electrode configured to contact a right side of a face, the first electrode being provided on a side of a wearing unit opposing the face, the wearing unit having an eyeglass frame, the eyeglass frame including a pair of temple portions, and a gyroscope is provided on the wearing unit;
   receiving data outputted from a second electrode configured to contact a left side of the face, the second electrode being provided on the side of the wearing unit opposing the face;
   receiving data outputted from a reference electrode adapted to measure a potential to be used as a reference, wherein the data outputted from the first electrode, the second electrode, and the reference electrode is input into a gaze detection unit and used for detecting a gaze direction of a wearer from potential differences;
   determining, by the gaze detection unit, whether potential difference between the first electrode and the reference electrode is below a threshold of a myoelectric potential and whether a potential difference between the second electrode and the reference electrode is below the threshold of the myoelectric potential, and based on determining that the potential difference between the first electrode and the reference electrode is below the threshold of the myoelectric potential and determining that the potential difference between the second electrode and the reference electrode is below a the threshold of a the myoelectric potential, the gaze detection unit detects the gaze direction of the wearer using only potential differences determined based on the data outputted from the first electrode, the second electrode, and the reference electrode; and detecting an inclination angle with respect to a reference plane based on a measured value by the gyroscope and adjusting the inclination of a right eye image and a left eye image so that the inclination angle becomes smaller than a predetermined angle.

9. An information processing apparatus, comprising:

a wearing unit having an eyeglass frame, the eyeglass frame including a pair of temple portions;

a first electrode configured to contact a right side of a face, the first electrode being provided on a side of the wearing unit opposing the face;

a second electrode configured to contact a left side of the face, the second electrode being provided on the side of the wearing unit opposing the face;

a reference electrode adapted to measure a potential to be used as a reference, wherein data outputted from the first electrode, the second electrode, and the reference electrode, is input into a gaze detection unit and used for detecting a gaze direction of a wearer from potential differences;

a projection section adapted to alternately project an image for a right eye and another image for a left eye; and a luminance adjustment section adapted to set a range with respect to the gaze direction to a right eye image and a left eye image and adjust a luminance value of pixels so that a portion of the right and left eye images other than the set range exhibits an invisible state, wherein the gaze detection unit determines whether a potential difference between the first electrode and the reference electrode is below a threshold of a myoelectric potential and determines whether a potential difference between the second electrode and the reference electrode is below the threshold of the myoelectric potential, and based on determining that the potential difference between the first electrode and the reference electrode is below the threshold of the myoelectric potential and determining that the potential difference between the second electrode and the reference electrode is below a the threshold of a the myoelectric potential, the gaze detection unit detects the gaze direction of the wearer using only potential differences determined based on the data outputted from the first electrode, the second electrode, and the reference electrode.

* * * * *